United States Patent [19]

Chou et al.

[11] Patent Number: 4,925,569
[45] Date of Patent: May 15, 1990

[54] PROCESS FOR SORPTION AND CATALYTIC OXIDATION OF SULFIDES IN WATER

[75] Inventors: Charles C. Chou; Donald C. Olson, both of Houston, Tex.

[73] Assignee: Shell Oil Company, Houston, Tex.

[21] Appl. No.: 291,717

[22] Filed: Dec. 29, 1988

[51] Int. Cl.$^5$ ................................................ C02F 1/74
[52] U.S. Cl. .................................... 210/713; 210/721; 210/725; 210/763
[58] Field of Search ............... 210/721, 724, 725, 727, 210/737, 752, 762, 763, 766, 713; 55/73

[56] References Cited

U.S. PATENT DOCUMENTS 4,009,251 2/1977 Meuly ................................. 210/763
4,784,775 11/1988 Hardison ............................. 210/763

Primary Examiner—Ivars Cintins
Attorney, Agent, or Firm—Ronald R. Reper

[57] ABSTRACT

A process is disclosed for reducing the level of sulfides in aqueous solutiuons which comprises contacting a sulfide-containing solution having a pH value in the range from about 8.5 to 12 with oxygen in the presence of a flocculent manganese-containing catalyst having been prepared by aerating an aqueous solution of a divalent manganese salt, said salt solution having a pH value in the range from about 8.5 to about 12.

11 Claims, No Drawings

PROCESS FOR SORPTION AND CATALYTIC OXIDATION OF SULFIDES IN WATER

BACKGROUND OF THE INVENTION

The invention relates to a process for rapid oxidation of sulfides in aqueous solution in the presence of a certain manganese-containing catalyst. The invention further provides a process for reducing the level of hydrogen sulfide in gases by contacting said hydrogen sulfide-containing gases with a certain manganese catalyst-containing sorbent.

Many modern industrial processes employed in the paper, natural gas, coal-mining, chemical and petroleum refining industries result in production of gases and aqueous waste streams containing varying amounts of hydrogen sulfide and/or sulfide ions. The sulfide ions may be associated with any of various cations such as sodium, ammonium and the like. Concern for the environment and applicable regulations preclude the discharge of such sulfide-containing water to receiving bodies of water such as rivers, lakes, estuaries and the like.

For waste water streams containing relatively large amounts of sulfide, e.g., more than about 0.2 percent by weight, it is conventional to contact the sulfide bearing water with acid and large amounts of steam to drive off, e.g., hydrogen sulfide gas. The hydrogen sulfide gas is recovered and converted, inter alia, to elemental sulfur having utility in fertilizer and other applications. With increasing energy costs, the expense of generating the copious steam needed to implement this procedure can be very costly. Such expense is exacerbated when only small or trace amounts of sulfide are present in relatively large streams, but nevertheless large amounts of steam must be used to remove the sulfide that is present.

For waste streams that contain only trace amounts of sulfide it is known to contact the stream with a source of oxygen such as air to convert the sulfide to environmentally acceptable conversion products such as sulfate ion, and thiosulfate ion (which thiosulfate is readily biologically converted to sulfate ion). However, the rate of sulfide oxidation is very slow, and this process can require considerable capital expense for facilities to treat large waste streams and those containing sulfides significantly above trace levels.

The rate of sulfide oxidation in aqueous streams can be improved by the use of catalysts. A number of catalysts for air oxidation of sulfides are known, including some containing manganese. See, e.g., A. T. Kuhn et al. "A Review of the Air Oxidation of Aqueous Sulfide Solutions," *J. Chem. Tech. Biotechnol.*, 33A, pp. 406–414, 1983, and M. A. Kessick et al. "Reactions Between Manganese Dioxide and Aqueous Sulfide," *Environmental Letters*, 7(2), pp. 163–173, 1974. However, in many instances the reaction rates still leave much to be desired.

A new process has now been discovered employing certain highly reactive catalyst and which can rapidly reduce the sulfide content of such aqueous solutions. The catalyst-containing solution can further be used to sorb hydrogen sulfide from gases in a gas-liquid contacting zone after which the solution can be passed to a further reaction zone to contact with molecular oxygen resulting in oxidation of the sulfide whereby the catalytic solution is regenerated and can then be recycled to the gas-liquid contacting zone to sorb hydrogen sulfide from further fresh sulfide containing gas.

SUMMARY OF THE INVENTION

The invention provides an improved process for oxidation of an aqueous solution containing sulfide ions which process comprises:

(a) introducing said sulfide ion-containing water as feed to a reaction zone, and contacting said feed with molecular oxygen in the presence of a flocculent catalyst prepared by aerating a divalent manganese salt in aqueous solution having a pH value in the range from 8.5 to 12, to obtain a heterogeneous reaction mixture having reduced level of sulfide ion, (b) phase separating said reaction mixture from step (a) to obtain (1) a reaction product liquid having reduced sulfide content, and (2) a slurry containing said flocculent catalyst, (c) withdrawing at least a portion of said reaction product liquid, and (d) contacting said slurry from step (b) with fresh feed in said reaction zone.

The invention further provides a process comprising the further step prior to step (a) of contacting a hydrogen sulfide-containing gas in a contacting zone with a sorbent solution comprising water having a pH value above about 10 and containing a flocculent precipitate formed by aerating a solution of a divalent manganese salt in water having a pH value from about 8.5 to 12, to obtain: (1) a gaseous product having reduced hydrogen sulfide content, and (2) a aqueous solution having increased sulfide content, and passing said aqueous solution to the reaction zone of step (a).

DESCRIPTION OF PREFERRED EMBODIMENTS

The sulfide solution feed to the instant process will generally be waste water originating from technological processes such as the production of natural gas, petroleum, sulfur or coal, the manufacture of paper, chemicals, rayon and/or petroleum products. However the process is not limited to waste water, and be used to "sweeten" water from naturally occurring "sulfur springs." Although the process can be used to oxidize any level of sulfide ion in the water it is particularly adapted to feed water containing from about 0.1 to about 500 parts per million by weight (ppmw) sulfide ion. As will be obvious to those skilled in the art, for quantities of aqueous sulfide solution containing much above about 2000 ppmw the use of steam stripping or other processes to recover the sulfur content may be more desirable.

The sulfide solution feed to the instant process will ordinarily have a pH value in the range from about 8.5 to about 12, and preferably from about 10.5 to about 11.5. If necessary, i.e., in the event a feed stream has a pH less than about 8.5, it should be pretreated by the addition of a basic substance to raise the pH value above about 8.5. Although in theory any basic substance may be used, it is preferred to employ, a hydroxide, carbonate or bicarbonate of a metal from Group I of the Periodic Table of the Elements. Preferred for its availability and generally low cost is sodium hydroxide. Generally basic materials which have only poor solubility in the feed are to be avoided as they are likely to encumber subsequent phase separation of the catalyst. The use of alkaline pH is important not only for the principal oxidation reaction, but to prevent undue solubilization of the flocculent catalyst.

The aqueous sulfide solution feed enters the reaction zone and is contacted with a molecular oxygen from any suitable source. Particularly suitable is air which typically contains about 21 per cent by volume (%v) of oxygen, or air which has been enriched to a higher oxygen content, up to about 99%v by any known process. When air is used as the oxygen source, it will be necessary to maintain the rate of addition below the flow rate that could result in stripping of some sulfide into the flow of the mostly nitrogen-containing vent gas. It is a particular advantage of the invention that in the presence of the catalyst system the rate of oxygen transfer from air into the reaction liquid is greatly accelerated, thereby enabling very rapid oxidation of the sulfide ions. Preferably the oxygen is added at a rate to maintain a positive dissolved oxygen in the reaction mixture, particularly a dissolved oxygen of at least about 2 ppm, and preferably above 3 ppm.

The temperature in the reaction zone is not critical, and may vary from about 5 to about 75° C., and preferably in the range from about 15 to about 45° C. Temperature in the reaction zone may be maintained at any desired level, preferably by the addition of heat or cooling to the feed prior to the reaction zone; but may also be added to the oxygen-containing gas or, when the instant process is practiced in a continuous mode, to the stream of slurried catalyst recycled from the separation zone to the reaction zone.

The reaction zone may comprise any conventional gas-liquid contacter typically used when the liquid also contains flocculent solids. Most preferably the reaction zone comprises a gas-liquid contacting tower or an upright enclosed vessel having at least one gas diffuser disposed in the lower part for sparging the oxygen-containing gas therethrough. If desired the reaction zone, may be equipped with a mechanical stirrer to ensure dispersion of the flocculent catalyst.

The instant process may be applied in a batch, continuous or semi-continuous manner, as desired. Residence time of the feed in the reaction zone will in large measure be dependent upon the amount of sulfide to be oxidized and the amount of dissolved oxygen maintained in the reaction zone liquid. Generally times from less than about 10 minutes up to about 2 hours will be suitable to assure substantially complete reduction of the sulfides. When this process is applied in a continuous manner typically the quality, i.e., sulfide content of the separated liquid reaction product will be monitored by any known method and the feed rate to the reaction zone controlled to ensure that any desired upper limit of sulfide content is not exceeded.

The flocculent manganese catalyst according to the invention is prepared by aerating a divalent manganese salt in aqueous solution having a pH value in the range from about 8.5 to 12. Good results have been obtained when the starting manganese salt contains water of hydration. Exemplary salts include, e.g., manganese nitrate, manganese sulphate hydrates, and manganese dichloride tetrahydrate. Upon aeration of the manganese salt solution a dark flocculent solid having great surface area and catalytic activity develops. The flocculent solid preferably is first prepared in a sulfide-free environment and is transferred to the reaction zone by any known method.

The flocculent catalyst has proven to be highly effective for oxidizing aqueous solutions containing hydrogen sulfide as well as bisulfide and sulfide ion at alkaline pH. Generally the rate of sulfide oxidation will be on the order of 2 to 4 kilograms of sulfide per kilogram of manganese per hour at a temperature of 25° C. In accordance with the process of the invention upon contact of the feed with oxygen in the presence of the manganese-containing flocculent catalyst the sulfide ions are oxidized to at least one of thiosulfate, sulfite and sulfate ions; typically elemental sulfur is not found in the reaction product. Optimal oxidation rates are achieved at pH values in the range from about 10.5 to about 11.5.

After the sulfide has been oxidized to the desired level the catalyst is phase separated from the reaction product and may be reused for to treat additional feed. In a batch mode, the addition of oxygen and any applied agitation is discontinued; thereby converting the reaction zone to a separation zone in which the flocculent catalyst is permitted to settle to the bottom of the reaction vessel. After settling of the flocculent catalyst, the supernatant liquid reaction product may be removed by any convenient technique such as decanting, siphoning and the like. Fresh feed and oxygen may now be added to the vessel which is thereby again converted to a reaction zone, any agitation again applied, and the entire process repeated.

Preferably the process is conducted in a continuous manner in which fresh feed to be oxidized is continuously fed to the reaction zone and a portion of the reaction mixture is continuously passed to a solid-liquid phase separation zone which may be a hydroclone, continuous centrifuge and the like, but preferred for its simplicity and low cost is a gravity separator, sometimes also referred to as a clarifier. From said separation zone the separated catalyst solids are recycled to the reaction zone to maintain the desired flocculent manganese to sulfide ratio in the reaction mixture; the liquid reaction product is passed from the separation zone for further processing or disposal.

The invention will now be illustrated with reference to the following examples.

EXAMPLE I

Catalyst was prepared by dissolving 3.2 grams of manganese dichloride tetrahydrate in 1 l of water at room temperature (25° C.). The pH of the solution was raised to about 12 by the addition of 10 N sodium hydroxide solution. Air was introduced into the clear solution by means of a sparger. A brownish flocculent precipitate formed almost immediately. Aeration was continued for about 30 minutes to assure complete formation of the flocculent catalyst.

EXAMPLE II

Into a 1 liter vessel containing 250 ml of sour water waste stream originating from a petroleum refinery and having an initial pH value of about 10.5 and sulfide content of 450 mg/liter was added 250 ml of the catalyst prepared according to the procedure of Example I. Ten N sodium hydroxide was added to the mixture to raise the pH to 12. Into this mixture at room temperature, air was sparged into the bottom of the vessel at the rate of 1 liter per liter of solution per minute for 60 minutes. Samples of the reaction liquid taken during the experiment were analyzed; results are shown in Table 1.

TABLE 1

Flocculent Mn-catalyzed Oxidation of Sulfide in Water

| Aeration Time (min) | Sulfide (S=, mg/l) | Thiosulfate ($S_2O_3$=, mg/l) | Sulfate ($SO_4$=, mg/l) | COD (mg/l) | pH |
|---|---|---|---|---|---|
| 0 | 450 | 68 | 20 | 925 | 12 |
| 5 | 400 | 31 | — | 835 | — |
| 10 | 325 | 84 | — | 770 | 11 |
| 20 | 150 | 231 | 40 | 625 | — |
| 40 | <1 | 560 | — | 460 | — |
| 60 | <1 | 600 | 64 | 425 | 10 |

EXAMPLE III

From the foregoing experiment the rate of sulfide oxidation rate was calculated and is compared with other catalyst materials in Table 2.

TABLE 2

Relative Sulfide Oxidation Rates in Sour Water

| Catalyst | Sulfide (mg/g/min) |
|---|---|
| $MnO_2$ Fine Powder | 0.1 |
| Preaerated Flocculent Manganese Catalyst | 40–60 |
| Sulfur-oxidizing Bacteria in Activated Sludge | 1–5 |

What is claimed is:

1. A process for oxidation of an aqueous solution containing sulfide ions which process comprises:
   (a) providing said sulfide ion-containing water having a pH value above 8.5 as feed to a reaction zone, and contacting said feed with molecular oxygen in the presence of a flocculent catalyst prepared by aerating a divalent manganese salt in aqueous solution having a pH value in the range from about 8.5 to 12, to obtain a heterogeneous reaction mixture having reduced level of sulfide ion,
   (b) phase separating said reaction mixture from step (a) to obtain (1) a reaction product liquid having reduced sulfide content, and (2) a slurry containing said flocculent catalyst,
   (c) withdrawing at least a portion of said reaction product liquid, and
   (d) contacting said slurry from step (b) with fresh feed in said reaction zone.

2. A process as in claim 1, which further comprises prior to step (a), adding a basic substance to raise the pH of said feed water to a value from about 10.5 to 11.5.

3. Process as in claim 1, wherein in step (a) the molecular oxygen added to the reaction zone is added in the form of air.

4. Process as in claim 1, wherein said manganese salt is selected from the group consisting of manganese sulfate and manganese dichloride.

5. Process as in claim 1 wherein in said reaction zone the reaction mixture contains at least about 2 ppm dissolved oxygen.

6. Process as in claim 1 wherein in said reaction zone the reaction mixture has a pH value from about 10.5 to about 11.5.

7. Process as in claim 1 wherein in said reaction zone the reaction mixture has a temperature in the range from about 5 to about 75° C.

8. Process as in claim 1 which comprises the further step prior to step (a) contacting a hydrogen sulfide-containing gas in a contacting zone with a sorbent solution comprising water having a pH value above about 10 and containing a flocculent precipitate formed by aerating a solution of a divalent manganese salt in water having a pH value from about 8.5 to 12, to obtain: (1) a gaseous product having reduced hydrogen sulfide content, and (2) a aqueous solution having increased sulfide content, and passing said aqueous solution to the reaction zone of step (a).

9. A continuous process for oxidation of aqueous solutions containing sulfide ions which process comprises:
   (a) providing said sulfide ion-containing water having a pH value above 8.5 to a reaction zone and contacting said water with molecular oxygen in the presence of a flocculent catalyst prepared by aerating a solution of divalent manganese salt in water having a pH value in the range from 8.5 to 12, to obtain a heterogeneous reaction mixture having reduced level of sulfide ion,
   (b) passing at least a portion of said reaction mixture from step (a) to a separation zone to obtain a reaction product liquid having reduced sulfide content, and a slurry containing said flocculent catalyst,
   (c) recycling said slurry to said reaction zone, and
   (d) passing said reaction product liquid from said separation zone.

10. Process as in claim 9 wherein after step (a) anionic polymer is added to said at least a portion of the reaction mixture passed to step (b) to aid in separation of the slurry from the liquid product.

11. Process as in claim 9 wherein in said reaction zone the average residence time of said sulfide containing water is in the range from about 0.1 to about 2 hours.

* * * * *